(12) United States Patent
Hoch

(10) Patent No.: US 7,047,540 B2
(45) Date of Patent: May 16, 2006

(54) GEAR RACK ARRANGEMENT HAVING RESILIENTLY BRACED GEAR RACKS AND ANTI-DETACHMENT MEANS

(75) Inventor: Peter Hoch, Triberg (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 310 days.

(21) Appl. No.: 09/911,437

(22) Filed: Jan. 16, 2002

(65) Prior Publication Data

US 2005/0076352 A1    Apr. 7, 2005

Related U.S. Application Data

(63) Continuation of application No. 08/443,518, filed on May 18, 1995, now abandoned.

(30) Foreign Application Priority Data

May 20, 1994   (DE)   .............................. P 44 17 690

(51) Int. Cl.
*G11B 7/08* (2006.01)
(52) U.S. Cl. .................... 720/659; 74/409; 74/89.17
(58) Field of Classification Search ................ 369/215, 369/75.2, 77.2, 251.1; 720/659; 74/409, 74/89.17
See application file for complete search history.

(56) References Cited

U.S. PATENT DOCUMENTS 4,631,716 A * 12/1986 Ikedo et al. ................ 369/75.2
5,119,357 A * 6/1992 Tsuruta et al. ............. 369/75.2
5,995,469 A * 11/1999 Uwabo et al. ............. 369/77.2
6,137,762 A * 10/2000 Uwabo et al. ............. 369/77.2

FOREIGN PATENT DOCUMENTS

JP        07317881 A  * 12/1995

* cited by examiner

*Primary Examiner*—Tianjie Chen
(74) *Attorney, Agent, or Firm*—Joseph S. Tripoli; Harvey D. Fried; Patricia A. Verlangieri

(57) ABSTRACT

The invention relates to a gear rack arrangement, which, for the compensation of backlash, comprises two gear racks (A, B) which are mutually displaceable on latch elements and are resiliently braced, and refers both to the assembly and disassembly characteristics of the gear rack arrangement and to the number of moulded elements used. Application is envisaged, in particular, for a positioning device in a recording and reproducing instrument for optical recording carriers, although the field of application is not however thereby restricted. According to the invention, an anti-detachment safeguard is provided, which is formed by an elastic boss (F). In order to prevent the detachment of a second gear rack (B) from a first gear rack (A) during the assembly or disassembly, the elastic boss (E) is provided at one end of one of the gear racks (A, B). Furthermore, a latch element (C, D) is provided as counter-rest for a means which braces the gear racks (A, B), whereby the number and shapes of necessary moulded elements is reduced. The field of application relates to the manufacture and to the assembly and disassembly of gear rack arrangements comprising, for the compensation of backlash, two gear racks (A, B).

8 Claims, 4 Drawing Sheets

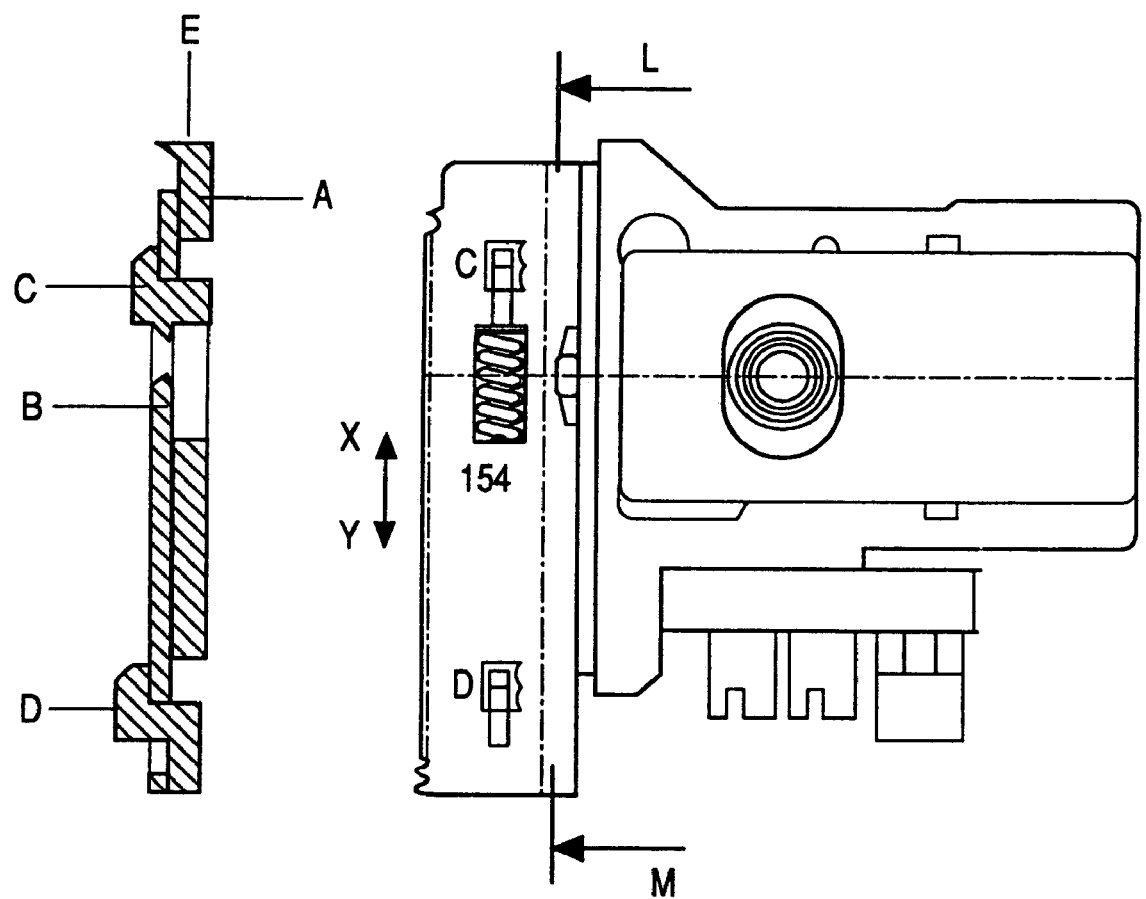

Schnitt G-H

Figure 3:
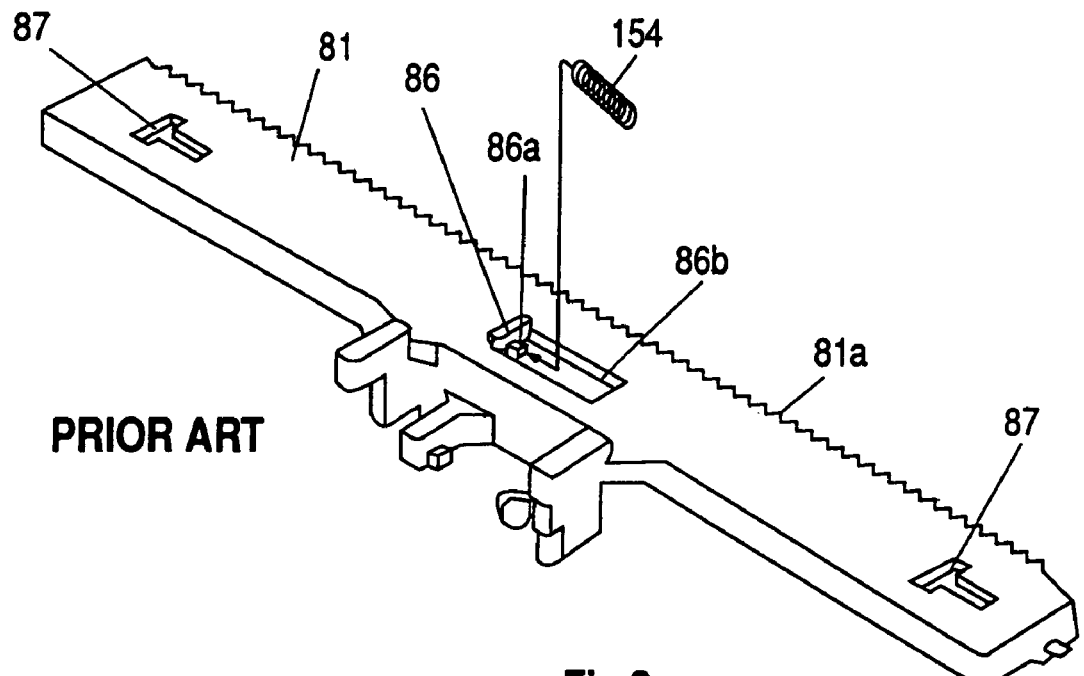

GEAR RACK ARRANGEMENT HAVING RESILIENTLY BRACED GEAR RACKS AND ANTI-DETACHMENT MEANS

This is a continuation of application Ser. No. 08/443,518, filed May 18, 1995, now abandoned.

The invention relates to a gear rack arrangement for the compensation of backlash associated with a gearwheel drive, comprises two gear racks braced resiliently one against the other, and refers both to the assembly and disassembly characteristics of the gear rack arrangement and to the number of moulded elements used. Application is envisaged, in particular, for a positioning device in a recording and/or reproducing instrument for optical recording carriers, although the field of application is not however thereby restricted.

A disc player is already known which, for the compensation of backlash, exhibits two gear racks braced resiliently one against the other, cf. EP 0356984 A2 FIG. 18–FIG. 20. In order to achieve a high positioning accuracy and to reduce slippage between the gear rack and gearwheel drive, means for compensating the backlash are necessary. To this end, two parallel-disposed gear racks are used, the rows of teeth of which engage in a pinion or a gearwheel drive, the gear racks being braced one against the other with a spring so as to receive the teeth of the pinion or gearwheel drive in a play-free manner. The known gear rack arrangement comprises a first gear rack and a second gear rack, which are braced one against the other with a spring. The first gear rack exhibits, at its opposing ends, T-shaped openings, a centrally disposed middle opening for receiving the spring which reciprocally braces the gear racks in a resilient manner. The T-shaped openings possess a narrowing portion, which is designed to guide and hold the second gear rack by latch bosses. The latch bosses of the second gear rack are designed to correspond to the T-shaped openings of the first gear rack. Furthermore, the first gear rack exhibits a projection which supports a journal, directed into the middle opening, for receiving the tension spring. The second gear rack, too, possesses a middle opening and a projection which exhibits a journal, directed into the middle opening of the gear rack, for receiving the spring. In order to create a gear rack arrangement having backlash compensation, the second gear rack is fitted together with the first gear rack. To this end, the latch bosses of the second gear rack are guided through the T-shaped openings of the first gear rack and the gear racks braced one against the other with a spring. In order to engage the gear rack arrangement with a gearwheel drive or a pinion, the toothings present on the lateral faces of the gear racks have to be mutually aligned. The second gear rack is displaced relative to the first gear rack, counter to the spring, in the longitudinal direction, in order, for the engagement in the drive gearwheel, to bring about a superposition of their rows of teeth and clamp the teeth of the drive gearwheel. Since the second gear rack is held by the first gear rack only in the narrowed portion of the T-shaped opening, this frequently results in the second gear rack jumping out as it is fitted together with the gearwheel drive and as the gear rack arrangement is removed from the gearwheel drive, during disassembly, whilst a repair is made.

The gear racks further exhibit numerous moulded elements and a plurality of different contours, thereby necessitating a high level of manufacturing complexity and complex tools. Denoted as a moulded element are the T-shaped openings, the T-shaped latch bosses, the projections and the journals inclusive of the middle openings.

The object of the invention is to provide a gear rack arrangement having backlash compensation, which, both in terms of its assembly and disassembly characteristics and in terms of the number and shapes of moulded elements used, eliminates the drawbacks of known solutions.

One aspect of the invention is to improve the assembly and disassembly characteristics of gear rack arrangements, which, for the backlash compensation, comprise two gear racks which are mutually displaceable and resiliently braced. To this end, at one end of a first gear rack, which exhibits latch bosses or latch hooks reaching through openings in a second gear rack, there is provided, as stop, an elastic boss. The elastic boss extends at one end of the first gear rack, starting from a face of the first gear rack, in line with the direction of the latch bosses or latch hooks. Latch hooks herein preferably exhibit a hanger directed towards the elastic boss. The second gear rack preferably possesses only slot-shaped openings, one of the slot-shaped openings merging, for the reception of the tension spring, into a widened slot region. The elastic boss forming a stop has the effect that the second gear rack, after having been joined with the first gear rack, during the insertion of the spring and during the mutual alignment of the gear racks, is captively connected and cannot jump out. When the gear racks are joined together, the openings of the second gear rack being guided over the latch bosses or latch hooks of the first gear rack, the elastic boss is spread out or plastically deformed and then limits the path of displacement, so that the gear racks are captively joined together. For the disassembly of the gear racks from each other, the elastic boss has to be spread out and, during the disassembly of the gear rack arrangement from a drive gearwheel or pinion, the captivity remains initially safeguarded. The elastic boss serves thus to improve both the assembly and disassembly characteristics of the gear rack arrangement. It is no longer possible for the second gear rack to jump inadvertently out from the first gear rack during assembly or disassembly, since the elastic or recoiling boss limits the path necessary for it to jump out or become detached. The elastic boss can also in principle be provided on the gear rack exhibiting no latch bosses or latch hooks, as path limitation means, for captivity purposes, in association with a second gear rack.

A second aspect of the invention is to reduce the number and shapes of the moulded elements used. This is achieved by virtue of the fact that the rear side of a latch hook is simultaneously used as a counter-bearing for the spring which braces the gear racks one against the other. This results both in savings in terms of projections and journals and in a lesser number of openings within the gear racks. Furthermore, in place of T-shaped latch bosses, latch hooks are provided. The second gear rack exhibits essentially slot-shaped openings, whereby the necessary tools and the manufacturing process are further simplified.

Figure 4:
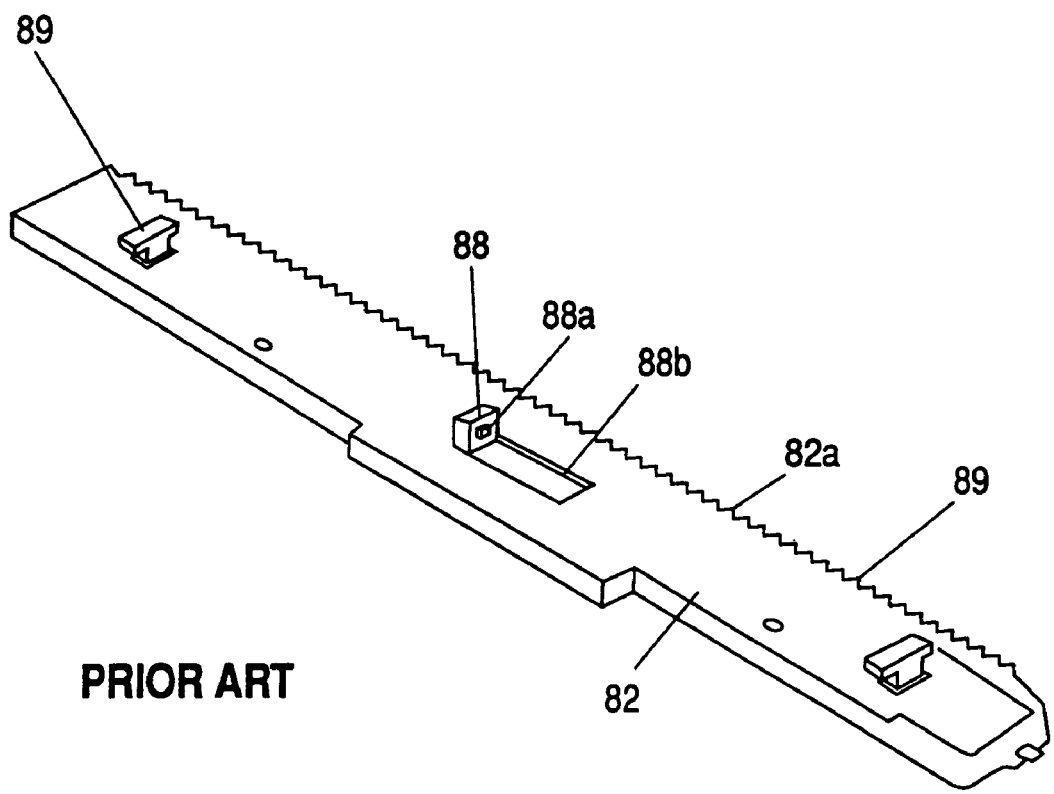
Figure 5:
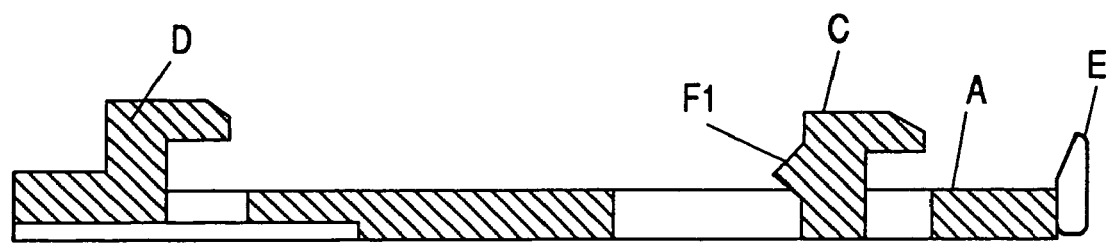
Figure 6:
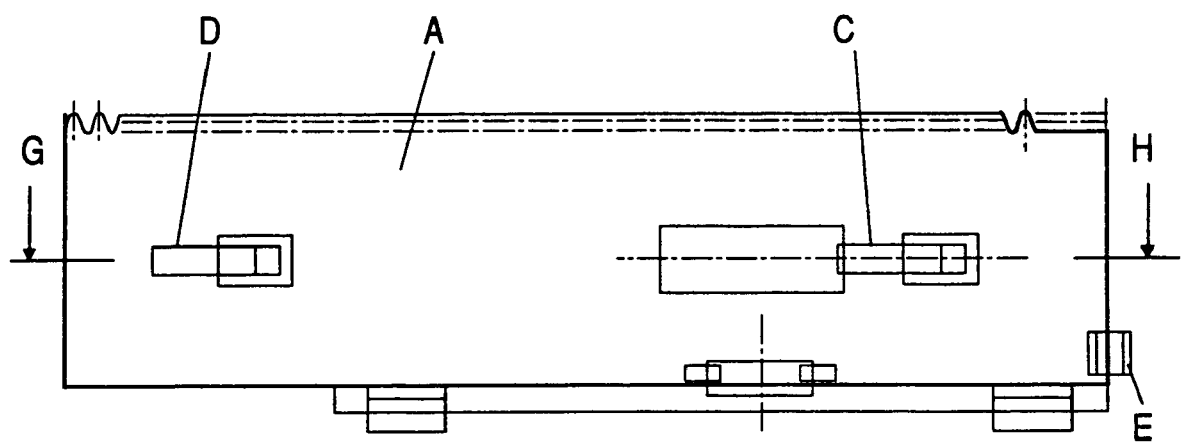
Figure 7:
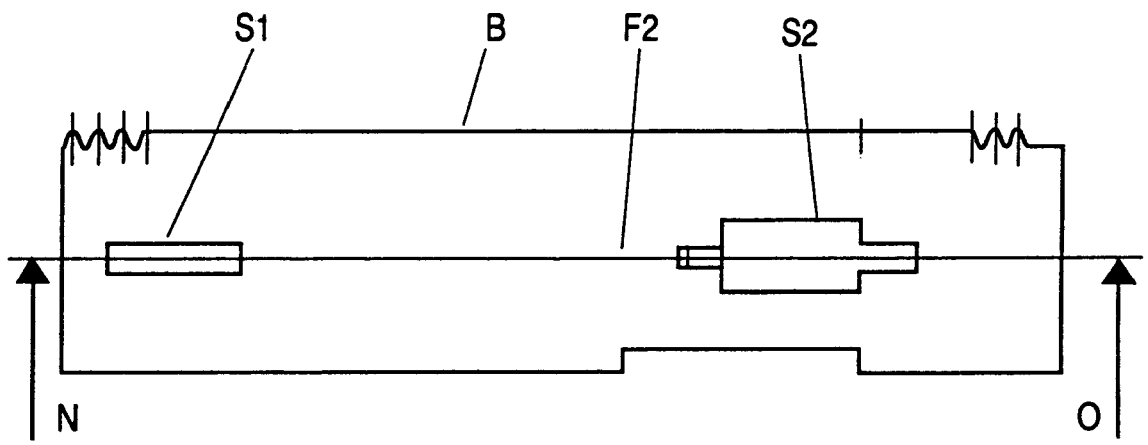
Figure 8:
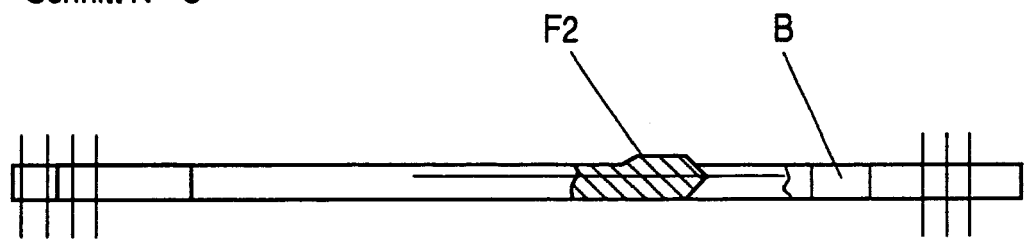

The invention is explained in greater detail below with reference to drawings, in which:

FIG. 1 shows a sectional representation of a gear rack arrangement having backlash compensation according to FIG. 2, FIG. 2 shows a top view of a gear rack arrangement having backlash compensation, FIG. 3 shows a perspective representation of a known first gear rack of a known gear rack arrangement, FIG. 4 shows a perspective representation of a known second gear rack of the known gear rack arrangement, FIG. 5 shows a sectional representation of a first gear rack, FIG. 6 shows a top view of the first gear rack according to FIG. 5, FIG. 7 shows a top view of a second gear rack of the gear rack arrangement, and FIG. 8 shows a sectional representation of the second gear rack according to FIG. 7.

In accordance with FIG. 1, a design of the gear rack arrangement having backlash compensation comprises a first gear rack A, a second gear rack B, a first latch hook C, a second latch hook D and an elastic boss E. The representation in FIG. 1 shows a section along the line L-M indicated in FIG. 2. In FIG. 2, there is further indicated a spring 154, by which the first gear rack A and the second gear rack B are braced resiliently one against the other. The gear racks A;B, prior to engagement in a gearwheel drive (not represented) or pinion (not represented), are mutually displaceable in a motional direction XY over a path distance limited by the latch hooks C, D and the elastic boss E. Following engagement in a gearwheel drive, the gear rack arrangement comprising the gear racks A, B, with the gearwheel drive (not represented), [lacuna] displaceable in the motional direction XY, with great accuracy and free from slippage, across a path length corresponding to the length of the gear racks A, B. FIGS. 3 and 4 relate to the known solution indicated as the prior art. This forerunner solution is known from EP 03 56 984 A2 and FIG. 3, which has been indicated in association with the present invention, essentially corresponds to FIG. 18 and FIG. 4 corresponds to FIG. 19 of the known solution. In these figures, the reference symbols of the known solution have also therefore been used. As already indicated as introduction to the description, the gear rack arrangement which is known according to EP 0356986 A2 FIG. 18–FIG. 20 exhibits, for the backlash compensation, two gear racks 81, 82, which are braced resiliently one against the other. The gear rack arrangement comprises a first gear rack 81 and a second gear rack 82, which are braced one against the other with a spring 154. The first gear rack 81 exhibits, at its opposing ends, T-shaped openings 87, and a centrally disposed middle opening 86b. The T-shaped openings 87 possess a narrowing portion, which is designed to guide the second gear rack 82 by latch bosses 89. Corresponding to the T-shaped openings 87 of the first gear rack 81, T-shaped latch bosses 89 are provided on the second gear rack 82. Furthermore, the first gear rack 81 exhibits a projection 86, which supports a quadrangular journal 86a, directed into the middle opening 86b, for receiving the spring 154. The second gear rack 82, too, possesses a middle opening 88b and a projection 88, which exhibits a quadrangular journal 88a, directed into the middle opening 88b, for receiving the spring 154. For the creation of a gear rack arrangement having backlash compensation, the second gear rack represented in FIG. 4 is rotated by 180 and fitted together with the first gear rack 81 represented in FIG. 3. The latch bosses 89 are herein guided through the T-shaped openings 87 and the gear racks 81, 82 braced one against the other by the spring 154. In order to engage the gear rack arrangement with a gearwheel drive or the pinion 59 represented in FIG. 21, the toothings 81a, 82a present on the lateral faces of the gear racks 81, 82 have to be mutually aligned. To this end, the second gear rack 82 is displaced relative to the first gear rack 81, counter to the spring 154, in the longitudinal direction. Since the second gear rack 82 is held by the first gear rack 81 only in the narrowed portion of the T-shaped opening 87, this frequently results in the second gear rack 82 jumping out during the assembly procedure. This is also true of the disassembly. Furthermore, the gear racks 81, 82 exhibit numerous moulded elements, there being denoted as a moulded element the T-shaped openings 87, the T-shaped latch bosses 89, the projections 86, 88 and the quadrangular journals 86a and 88a inclusive of the middle openings 86b and 88b.

In order to prevent the second gear rack 82 from possibly being detached or from jumping out during the assembly, wherein the gear racks 81, 82 are initially hung one inside the other and the spring 154 is then inserted, the T-shaped latch bosses 89 cannot, for example, be constructed as a so-called "snap-in connection", since the gear racks 81, 82, for the backlash compensation and for the compensation of irregularities of an engaging gearwheel drive, have to be mutually displaceable with a resilient force.

In order, despite the necessary mutual displaceability, to design the gear racks 81, 82 or the gear racks A and B such that they cannot be detached, an elastic boss E, which is represented in FIGS. 1 and 2 and in FIGS. 5 and 6, is provided. The elastic boss E, after the gear racks A, B have been joined together, limits the path over which the gear racks A, B are mutually displaceable, so that they are secured against detachment during assembly or disassembly. To this end, according to FIG. 5 and FIG. 6, an elastic boss E is provided at one end of the first gear rack A. The elastic boss E is provided at that end of the first gear rack A which is directed towards the suspension projections of the latch hooks C, D. As represented in FIG. 6, the elastic boss E is disposed eccentrically relative to a connecting line G, H formed by the latch hooks C, D, thereby exerting a positive influence upon the insertion procedure. The connecting line G, H in FIG. 6 simultaneously forms the sectional line G, H for the representation in FIG. 5. Furthermore, the mutually facing faces of the latch hooks C, D and of the elastic boss E are designed to be bevelled so as to simplify the mounting of the second gear rack B represented in FIGS. 7 and 8 and hence the assembly procedure. The slot-shaped openings S1 and S2 of the second gear rack B are guided over the latch hooks C, D and the planar sides of the gear racks A, B forced together. Due to the said bevels of the elastic boss E and of the latch hooks C, D, only a small degree of centring accuracy is necessary, thereby advantageously enabling the assembly procedure to be automatized. During the assembly or as the second gear rack B is being slid into the anti-detachment safeguard formed by the latch bosses C, D in conjunction with the elastic boss E, the elastic boss E is slightly spread out or plastically deformed in the end inlet region for the latching engagement of the second gear rack B. Despite this latch-locking, the gear racks A, B are mutually displaceable in the longitudinal direction by a path distance which enables the rows of teeth of the gear racks A, B to be mutually aligned.

To enable the gear rack arrangement to assume the backlash compensation function, they are braced one against the other with a spring 154 represented in FIG. 1. Prior to the insertion of the spring 154, the gear racks A, B are easily mutually displaceable. The anti-detachment safeguard formed with the elastic boss E ensures, in contrast to the gear racks 81, 82 indicated in FIGS. 3 and 4, that the gear racks A, B cannot be separated from one another by transportation, handling or vibrations such that, even before the tension spring 154 is inserted, it becomes necessary to join them together again. As already mentioned, the gear racks A, B, after they have been joined together, are braced one against the other with a spring 154, the spring force being directed such that it forces the second gear rack B into the suspension mounting of the latch hooks C, D. In order to reduce the, number and shapes of moulded elements of the gear racks A, B, in contrast to the T-shaped latch bosses 89 of the known gear rack arrangement in accordance with FIGS. 3 and 4, latch hooks C, D are provided, which, starting from the face of the first gear rack A, exhibit only a parallel extent to the base surface. The manufacturing process and the tools necessary for the manufacture are thereby simplified. As illustrated by FIGS. 5 to 8, the number of openings to be provided has also been reduced. This has been achieved by the fact that, in an advantageous manner, the side facing away from the suspension side of a latch boss C is simultaneously used as counter-rest for the spring 154 (not represented in these figures). To this end, on the latch hook C on the said side, a projection F1 is provided to prevent the spring 154 from slipping. A roof-shaped contour, which is advantageous from the production-engineering aspect, has been chosen for the projection F1, other holding contours, such as, for example, journals or recesses, also being in principle possible, which do not however exhibit the aforementioned advantage. Also the counter-rest for the spring 154 on the second gear rack B exhibits as holding means, according to FIG. 8, a projection F2, which is of roof-shaped configuration. FIG. 8 shows a sectional representation on the line N, O indicated in FIG. 7. The second gear rack B, which is represented in FIGS. 7 and 8, essentially only still possesses the slot-shaped openings S1, S2 and the projection F2 jutting into the slot-shaped opening S2, thereby further reducing the manufacturing and tool complexity. As illustrated by FIGS. 5 to 8, the number and shapes of the moulded elements are substantially reduced and a latch hook C or latch element is advantageously simultaneously used as counter-rest for the tension spring 154. As counter-rest for the tension spring 154, a latch element which is further distanced from the elastic boss E can also be used, so that the application is not limited to the solution specified in this design.

The application and use of the proposed gear rack arrangement is particularly advantageous in association with gear rack arrangements, to be made from plastics material, for positioning devices in scanning and recording instruments for the recording and reproduction of information by means of optical, magnetic or magneto-optical recording carriers, although the field of application is not however thereby and thereto restricted. For example, other materials can also be used for the manufacture or other means used for the reciprocal bracing of the gear racks.

The invention claimed is:

1. Gear rack arrangement, comprising:
   two mutually displaceable and resiliently braced gear racks having suspension mountings of at least one latch hook disposed on one braced gear rack and corresponding slot-shaped openings disposed in the other one of the gear racks, for providing a portion of an anti-detachment safeguard and while enabling the pair of gear racks to be mutually displaceable,
   the anti-detachment safeguard including an elastic boss disposed on at least one of the gear racks in order to prevent detachment of the other gear rack when suspension mountings including latch hooks are in a position with respect to the slot-shaped openings where the latch hooks are being slid into the slot-shaped openings.

2. Gear rack arrangement according to claim 1, characterized in that the anti-detachment safeguard is formed by an elastic boss.

3. Gear rack arrangement according to claim 2, characterized in that the an elastic boss is provided on at least one of the gear racks.

4. Gear rack arrangement according to claim 2, characterized in that the an elastic boss, in order to prevent the detachment of a second gear rack form a first gear rack, is provided at one end of the of the gear racks.

5. Gear rack arrangement according to claim 2, characterized in that the an elastic boss is designed to be plastically deformable.

6. Gear rack arrangement according to claim 1, wherein said elastic boss arranged opposite to suspension mountings of said latch hooks.

7. Gear rack arrangement, comprising:
   two gear racks, which are mutually displaceable on latch elements and are resiliently braced,
   one of the latch elements comprises a brace means for providing a portion of an anti-detachment safeguard while enabling the pair of gear racks to be mutually displaceable and
   a roof-shaped projection for holding and forming a counter-rest for a spring.

8. Gear rack arrangement according to claim 7, characterized in that the counter-rest for a means which braces the gear racks exhibits, as holding means, a roof-shaped projection.

\* \* \* \* \*